Sept. 23, 1958     H. E. WILTSEY     2,853,242
DIRT-ELIMINATING AUGER CONVEYOR FOR A COTTON STRIPPER
Filed June 29, 1954
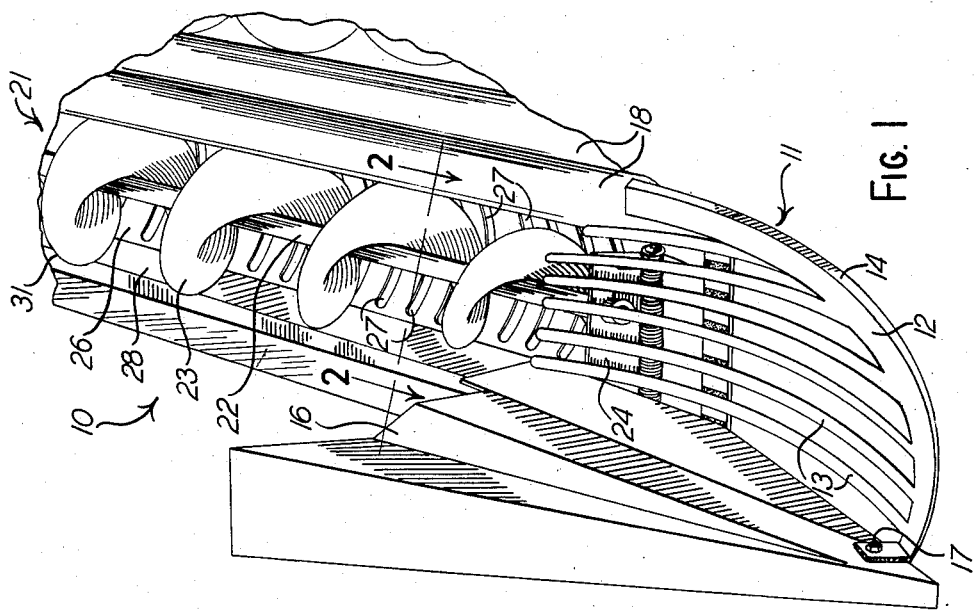
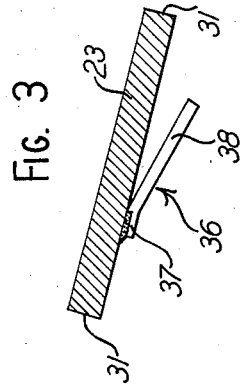
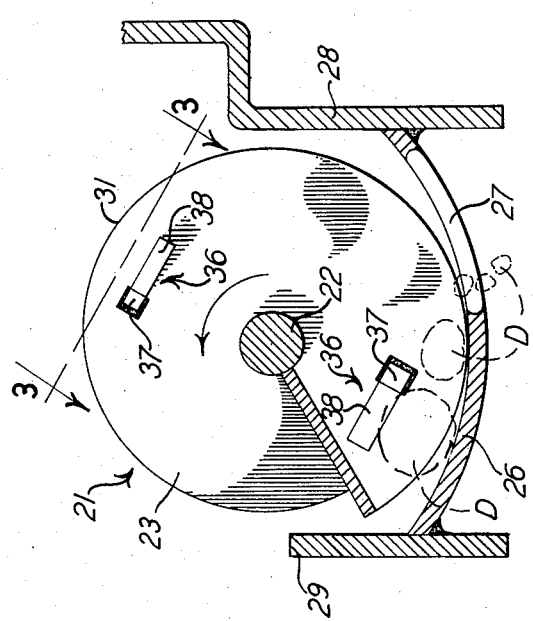
INVENTOR:
HOWARD E. WILTSEY
BY: *Emerson B Donnell*
ATTORNEY

United States Patent Office 2,853,242
Patented Sept. 23, 1958

2,853,242

DIRT-ELIMINATING AUGER CONVEYOR FOR A COTTON STRIPPER

Howard E. Wiltsey, Racine, Wis., assignor to J. I. Case Company, Racine, Wis., a corporation of Wisconsin Application June 29, 1954, Serial No. 439,980

1 Claim. (Cl. 241—68)

This invention pertains to auger conveyors, and, more particularly, it pertains to auger conveyors with means for disposing of clods of dirt, or the like, which is on the conveyor and is undesirable. Such type of auger conveyor is that employed in cotton picking units.

It is an object of this invention to provide an auger conveyor which will automatically dispose of clods of dirt during the normal operation of the auger.

Another object is to provide an auger conveyor which will separate dirt from the material desired to be conveyed.

An additional object is to provide a modification of existing auger conveyors with the result of achieving the foregoing objects through a minimum of time, effort, and expense required to effect the modification.

Other objects and advantages will become apparent upon reading the following description in conjunction with the accompanying drawings, wherein, Fig. 1 is a fragmentary front perspective view of an auger conveyor containing a preferred embodiment of this invention.

Fig. 2 is a sectional view taken on the line 2—2 of Fig. 1.

Fig. 3 is a sectional view taken on the line 3—3 of Fig. 2.

Similar reference numerals refer to similar parts throughout the three views.

Fig. 1 shows a fragment of a cotton picking unit 10 which is commonly employed in a cotton stripper wherein this invention has particular application. All of the construction apparent in Fig. 1 is conventional and it is generally mounted on a tractor for movement through rows of cotton plants to remove the cotton bolls therefrom while leaving the plants unharmed in the ground. In the embodiment shown, the leading end of the unit 10 is provided with a gathering point 11. Normally, a pair of the points 11 is attached to the front of the unit 10 to guide the latter along the rows of cotton. For this purpose, it is desirable to provide a shoe 12 with concaved forks or grates 13 which are inclined upwardly toward the rear of the point 11. Also, the shoe 12 preferably includes a curved leading edge 14 available for the function of aligning the unit 10 with the rows of cotton plants. It should be understood that the edge 14 is also inclined upwardly to the rear, and the forward end of the edge usually slides along the ground in the cotton stripping operation. Connected to the shoe 12 is a generally vertically disposed outside sheet 16 which is shown connected at one point by a bolt 17.

A pair of stripping rolls 18 is rotatably mounted in the unit 10 to also be inclined upwardly to the rear and to abut at their inner peripheries which are aligned tangentially with the rear of the curved edge 14. In this manner, the rolls 18 engage opposite sides of a row of cotton plants and press the plants from bottom to top, thereby stripping cotton bolls from the plants. The rolls rotate in opposite directions for this operation and one is preferably spring loaded to provide a yielding pressure on the cotton plants and thereby avoid injuring the latter.

Mounted within the unit 10 is the operating part of an auger conveyor 21 which is parallel and offset below with respect to the rolls 18. Normally, an auger 21 is provided on both sides of the rolls 18, but for this description, only one auger need be shown. The auger 21 consists of a shaft 22, around and along which is attached a continuously spiraled length of a sheet 23 forming an auger flight. The shaft 22, and thus the auger 21, is supported at its lower end in a bracket 24 which is attached to the side of the unit 10 in any well known manner.

To complete the description of the auger conveyor 21, it is noted that a lower perforated trough 26 is suitably attached stationarily to the unit 10 to be parallel to the shaft 22 and form a floor for the conveyor. The trough 26 is concave and provided with a plurality of spaced openings 27. In the embodiment shown, the opposite sides of the trough 26 have vertical trough sides 28 and 29 attached thereto as by welding.

Fig. 2 shows the location of the auger shaft 22 and the outer edge 31 of the flight 23 with respect to the bottom trough 26. The edge 31 is closest to the trough 26 at the point directly below the shaft 22, as shown. Also, it should be noticed that the auger shown happens to be of the tapered type which diminishes at its lower end. This feature is best shown in the sectional view of Fig. 2.

The operation of the auger described accomplishes the transportation of material, such as cotton bolls, from the lower end of the auger to the upper end thereof. In this operation, the auger is rotated in the direction indicated by the arrow in Fig. 2 and, therefore, it pushes material along its spiraled flights as desired when the material is disposed on the bottom of the trough 26. In the cotton stripper unit shown, as previously mentioned, cotton bolls are picked by the rolls 18 and the bolls then drop into the side troughs 26 where they are conveyed along as described. For the purpose of dropping bolls into the trough, the trough side 29, adjacent the rolls, is lower than the side 28.

The foregoing is a description of a conventional type of auger conveyor; the following describes the improvement thereof in this invention and how the conventional auger combines with the improved parts to effect the desired new result.

Initially, it should be realized that operation of the picking unit 10 will cause clods or lumps of dirt to be scooped upon the shoe 12 and deposited into the trough 26. This undesirable occurrence has long been a problem in this type of harvesting of cotton, since that dirt will, of course, be mingled with the cotton bolls unless it is removed. This invention provides an effective means for removing the dirt which is normally too large to fall through the openings 27 in the base of the auger trough 26. In the embodiment shown, angled projecting bars or clod crushers 36 are attached to the forward or operating face of the auger flight 23, as shown in Figs. 2 and 3. The bars 36 consist of two sections 37 and 38 angularly related with section 37 being preferably welded to the auger at a slight distance in from the edge 31. The section 38, as best seen in Fig. 3, is bent from section 37 to angle away from the forward face of the auger and to be on the trailing end of the bar 36 in the auger rotation. Also, a bar 36 is preferably spaced every one hundred and eighty degrees around the auger flight.

With the foregoing construction, rotation of the auger in the direction shown in Fig. 2 will cause the bar section 38 to engage a clod of dirt, shown in dotted lines and designated "D". The dirt "D" is occasionally picked up from the ground by the shoe 12 and deposited into the trough 26. As indicated, the dirt is crushed by the bar 36 and caused to fall from the trough 26 through the perforations 27. This avoids the action of the auger edge 31 slicing through the clod of dirt or the action of the auger delivering the dirt to the destination of the intermingled bolls of cotton. It is also important to appreciate that in this action the cotton bolls are usually not caught by the bar 36 in the manner that the dirt is caught. However, if the bolls are crushed under the bar 36 they, of course, would not be disintegrated and would not fall out of the trough. Therefore, the dirt is dispensed with and the cotton is unharmed.

While a specific embodiment of this invention has been shown and described, the scope thereof should be limited only by the appended claim.

I claim:

A dirt eliminating conveyor for a cotton stripper comprising an auger having a spiral flight providing a material propelling working face, a trough in which said auger is rotatable and providing openings through which dirt may be discharged, and a clod crusher mounted on said working face spaced inwardly from the outer margin of said flight and comprising a bar fixed to said face and extending therefrom in trailing relation to the rotation of said auger substantiallly tangent to a circumference within the margins of the auger flight and inclined from said face in the direction of movement of material propelled by the auger whereby said clod crusher will encounter and crush any frangible material between itself and said trough for discharge of the resulting fragments through said openings.

References Cited in the file of this patent

UNITED STATES PATENTS

| | | |
|---|---|---|
| 301,506 | Massey | July 8, 1884 |
| 1,982,799 | Evans | Dec. 4, 1934 |
| 2,032,338 | Anderson | Feb. 25, 1936 |
| 2,195,815 | Hanna | Apr. 2, 1940 |
| 2,538,166 | Roscoe et al. | Jan. 16, 1951 |
| 2,605,798 | Boswell | Aug. 5, 1952 |